United States Patent [19]

Holtz

[11] Patent Number: 5,709,048
[45] Date of Patent: Jan. 20, 1998

[54] NATURAL SAVORY AND UMAMI FLAVORING MATERIALS FROM DEHYDRATED MUSHROOM

[76] Inventor: R. Barry Holtz, 3808 Serenity Hills Dr., Vacaville, Calif. 95688

[21] Appl. No.: 576,189

[22] Filed: Dec. 21, 1995

Related U.S. Application Data

[62] Division of Ser. No. 251,470, Jun. 1, 1994, Pat. No. 5,522, 175.

[51] Int. Cl.$^6$ .............................. A01G 1/04; A01H 3/04
[52] U.S. Cl. .............................. 47/1.1; 47/58; 71/5
[58] Field of Search .............................. 47/1.1, 58; 71/5; 435/244, 254.1

[56] References Cited

U.S. PATENT DOCUMENTS

| | | | |
|---|---|---|---|
| 3,942,969 | 3/1976 | Carroll, Jr. et al. | 71/5 |
| 4,127,965 | 12/1978 | Mee | 47/1.1 |
| 4,370,159 | 1/1983 | Holtz | 71/5 |
| 4,420,319 | 12/1983 | Holtz | 71/5 |
| 4,421,543 | 12/1983 | Holtz | 71/5 |
| 4,534,781 | 8/1985 | Wu et al. | 71/5 |
| 4,537,613 | 8/1985 | Pebeyre et al. | 71/5 |
| 4,617,047 | 10/1986 | Bretzloff | 71/5 |
| 4,764,199 | 8/1988 | Pratt et al. | 71/5 |
| 4,776,872 | 10/1988 | Mulleavy et al. | 71/5 |
| 4,818,268 | 4/1989 | Holtz | 71/5 |
| 4,874,419 | 10/1989 | Wu | 71/5 |
| 4,990,173 | 2/1991 | Katz et al. | 71/5 |
| 5,018,301 | 5/1991 | Kusakabe et al. | 47/1.1 |
| 5,057,141 | 10/1991 | Rodriguez-Kabana et al. | 71/28 |
| 5,123,203 | 6/1992 | Hiromoto | 47/1.1 |
| 5,127,933 | 7/1992 | Hallett | 71/5 |

FOREIGN PATENT DOCUMENTS

| | | | |
|---|---|---|---|
| 0564026 | 10/1993 | European Pat. Off. | B65B 25/04 |
| 1309911 | 10/1962 | France | A23B 7/148 |
| 468538 | 7/1937 | United Kingdom | A23B 7/148 |
| 2210868 | 6/1989 | United Kingdom | C05G 3/00 |
| WO-A-82/ 00637 | 3/1982 | WIPO | C05F 11/08 |

OTHER PUBLICATIONS

*Patent Abstracts of Japan* 018(296):C–1209, Jun. 6, 1994, from JP,A,06, 062729 (Dainippon Printing Co. Ltd.) Mar. 8, 1994.

Cronin, D.A., Ward, Margaret. "The Characterization of Some Mushroom Volatiles". J. Sci Fd Agric. 22 Sep. (1971): 477–479.

Holtz, R. Barry, Schisler, Lee C. "Utilization of Fatty Acids by *Agaricus bisporus* In Commercial Culture". *Mycologia* 78(5) (1986): 722–727.

Holtz, Barry R., Schisler Lee C. "Lipid Metabolism of *Agaricus bisporus* (Lange) Sing.: 1. Analysis of Sporophore and Mycelial Lipids". *Lipids* 6(3) (1971): 176–180.

Wurenberger, Margot, Grosch, Werner. "Origin of the Oxygen in the Products of the Enzymatic Cleavage Reaction of Linoleic Acid to 1–Octen–2–ol and 10–Oxo–Trans–8–Decenoic Acid in Mushrooms (*Psalliota bispora*)". *Biochimica et Biophysica Acta.* 794 (1984): 18–24.

Mau et al. (1991) Mycologia 83(2): 142–149.

*Primary Examiner*—David T. Fox
*Assistant Examiner*—Melissa L. Kimball
*Attorney, Agent, or Firm*—Albert P. Halluin; Howrey & Simon

[57] ABSTRACT

The present invention relates to the production of three (3) distinct savory flavor types of dehydrated mushrooms: (1) a light-colored material with strong mushroom flavor, (2) a tan-colored material with a meaty, buttery and savory flavor and (3) a dark-colored material with a beefy, meaty, chocolate flavor. All three products exhibit "umami" or monosodium glutamate (MSG)-like mouthfeel and flavor synergy. The mushrooms are produced using specialized nutrient additives, controlled growing conditions and specialized dehydration protocols.

8 Claims, 4 Drawing Sheets

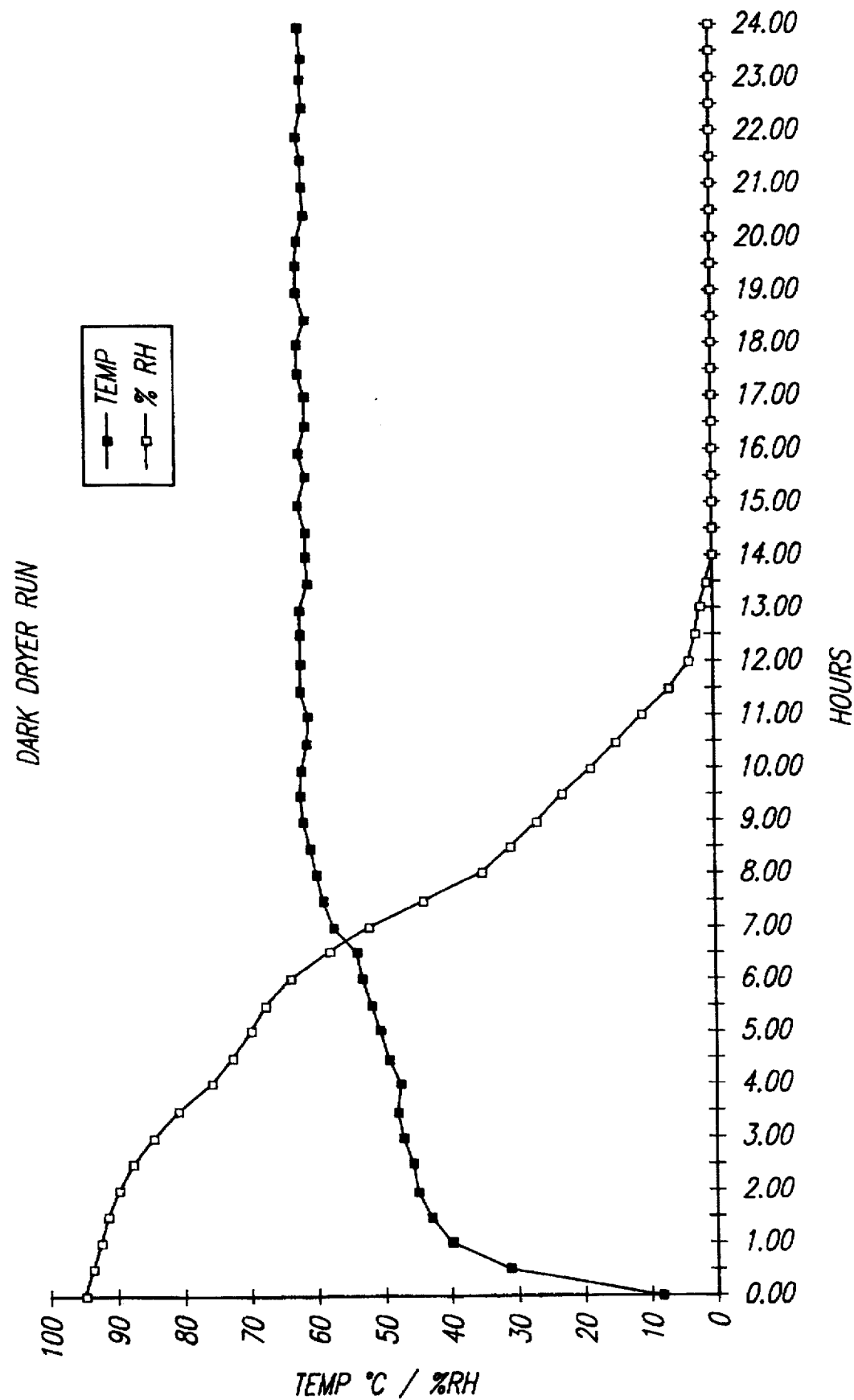

5,709,048

NATURAL SAVORY AND UMAMI FLAVORING MATERIALS FROM DEHYDRATED MUSHROOM

This is a division of application Ser. No. 08/251,470, filed Jun. 1, 1994, now U.S. Pat. No. 5,522,175.

FIELD OF THE INVENTION

The present invention relates to three natural flavoring materials produced from dehydrated mushrooms that are applied to the meaty, savory, and Umami (monosodium glutamate like) flavor applications. The first flavoring material has a light color and enhanced and intensified mushroom flavor. The second flavoring material has a tan color and a meaty, buttery, savory flavor. The third flavoring material has a dark color and a beefy savory, chocolate flavor. All of the products exhibit increased "umami" or monosodium glutamate (MSG)-like flavor enhancement. The mushrooms are grown with specific nutrient supplements and cultural conditions that enhance the substrates for flavor formation. The present invention also relates to a method for selectively producing different highly flavored, dehydrated mushrooms by controlling the conditions of dehydration.

BACKGROUND OF THE INVENTION

In the United States alone, hundreds of millions of pounds of mushrooms are produced and eaten annually. The most commonly grown species in the United States is *Agaricus bisporus* (the button mushroom). Other common mushroom species include *Lentinus edodes* (Shiitake), and *Pleurotus ostreatus* (oyster mushroom).

Mushrooms represent an important flavor component in food. One application of mushrooms in food preparations is as a dehydrated flavor product. Dehydrated mushroom products are used in dehydrated consumer foods such as soups and sauces, as a natural consumer flavoring product for cooking at home, and as an industrial flavoring material for a myriad of prepared foods. Development of improved, more highly flavored, dehydrated mushroom and mushroom products could greatly enhance the total market for mushroom production. In addition, by creating new and enhanced-flavored, dehydrated mushroom products, such as mushrooms with a meaty, savory and umami flavor, entirely new applications for dehydrated mushrooms could be created.

In order to effectively increase the flavor of a dehydrated mushroom, two metabolic events must occur. First, the amount of total unsaturated fatty acids in the mushroom tissue must be increased. The flavor of mushrooms is attributed, in part, to a variety of fatty acid oxidation products. D. A. Cronin, *J. Sci. Fd Agric.* (1971) 22:477. Increasing the fatty acid content in mushrooms is, therefore, needed to enhance the flavor content of mushrooms. Secondly, the activity of enzymes that oxidize fatty acids to oct-1-ene-3-ol and other volatile oxidation products associated with mushroom flavor and other meaty, savory flavors must be increased.

In order to induce these two metabolic events, delayed-release nutrients must be used in combination with a comprehensive cultural plan designed to assure an increase in lipid substrates and the stimulation of enzymatic activity.

Mushrooms are generally grown on a compost consisting of a complex of organic materials developed by the chemical and microbial degradation of such raw materials as straw, horse manure, chicken manure, cottonseed meal, and gypsum. The compost is pasteurized in an indoor environment and controlled for $CO_2$, air flow, temperature and pH conditions. In order to produce mushrooms, the compost is inoculated with a vegetative mycelia of the fungus. The vegetative mycelial are allowed to grow for a period of approximately two weeks at temperatures between about 71° F. and 79° F.

During the final growth period when the familiar mushroom fruit body is produced, the compost is covered with "casing", a 1½ inch layer of moist peat moss that contains limestone as a buffering agent. The temperature and $CO_2$ levels are lowered during this period in order to induce mushroom fruit body growth. This process is known as "flushing."

During the final growth period, the mycelia that have grown into the casing layer start to form clusters of thickened hyphal strands called rhizomorphs. The rhizomorph is the support tissue upon which the fruiting body, or sporophore grows. The first fruiting bodies are harvested approximately three weeks after the casing is introduced.

Mushroom yields have been enhanced by the addition of vegetable oils at the time of spawning. U.S. Pat. No. 4,421,543. However, the grower must admix raw nutrients into the compost which is already colonized by vegetative mycelia. Introduction of the raw nutrients into the compost causes a rapid increase in metabolic heat which can make it difficult to keep the compost below 90° F. in order to avoid killing the mycelia. Control of the metabolic heat requires an extra processing step that is disruptive to the grower.

At present, a nutrient supplement is needed that can be introduced without disrupting mushroom growth that increases the lipid content of mushrooms, thereby increasing the mushrooms flavor capacity.

Four general reactions control the color and flavor created in a dehydrated mushroom during the dehydration process. These reactions are: (1) lipoxygenase enzyme oxidations, (2) polyphenol oxidase enzyme reactions, (3) Maillard browning reactions, and (4) Strecker degradation.

Lipoxygenase reactions convert fatty acids into a series of volatile compounds such as oct1-en-3-ol and oct-1-ene-3-one. These compounds are responsible for the mushroom, musty, earthy, and savory flavors. Polyphenol oxidase is responsible for the oxidative browning of the mushroom by the formation of melanins from tyrosine and phenylalanine and forms tannins and other compounds contributing to astringency and bitter flavors. Maillard browning is a non-oxidative series of browning reactions between reducing sugars and amino acids that produces dark polymers and flavor compounds such as furfurals which impart nutty and meaty flavors. Strecker degradation of amino acids forms pyrazines, and organic sulfides which add other meaty, nutty, and chocolate notes.

In order to control the resulting flavor of the dehydrated mushrooms, one must control the degree to which the mushrooms undergo lipoxygenase enzyme oxidations, polyphenol oxidase enzyme reactions, Maillard browning reactions, and Strecker degradation. At present, a method is needed for producing differently flavored mushrooms by controlling the extent to which the mushrooms undergo these four reactions.

SUMMARY OF THE INVENTION

The present invention relates to three distinct savory flavor types of dehydrated mushrooms. All of these types have, in addition to their flavor characteristics, the ability to provide the "umami" or monosodium glutamate (MSG)-like mouthfeel and flavor synergy. The three flavor types are: (1)

light-colored, dehydrated mushrooms having a strong mushroom flavor, (2) tan-colored, dehydrated mushrooms having a meaty, buttery, savory flavor, and (3) dark-colored, dehydrated mushrooms having a beefy, savory, chocolate flavor.

The present invention also relates to a method for producing highly flavored dehydrated mushrooms having a specific flavor by dehydrating the mushrooms under conditions where the air flow rate, temperature and $CO_2$ concentration are controlled. According to the dehydration method, either light-colored, dehydrated mushrooms having a strong mushroom flavor, tan colored dehydrated mushrooms having a meaty, buttery, savory flavor, or dark colored dehydrated mushrooms having a beefy, savory, chocolate flavor are produced.

The present invention also relates to a growth media for producing mushrooms with a higher lipid content. The media is composed of compost and a nutrient supplement that enhances the lipid content of the mushrooms produced. The nutrient supplement is composed of a particulate non-nutritive hydrophobic matrix with a particle size of between 20 and 80 standard mesh, a polyunsaturated fat and a food grade surfactant. The surfactant preferably comprises 1%–3% by weight of the polyunsaturated fat. The polyunsaturated fat preferably constitutes between 30% and 45% by weight of the hydrophobic matrix. The polyunsaturated fat is a vegetable oil and the surfactant is preferably either a phospholipid or a galactolipid, most preferably lecithin phosphatide. The nutrient supplement preferably comprises between 3.2% and 5.4% by dry weight of the compost.

The present invention also relates to a method for growing mushrooms with a higher lipid content. According to the present method, a mushroom compost is prepared with a delayed-release nutrient added at the time of inoculation (spawning). The vegetative phase (spawn run) of the mushroom is allowed to grow for a two-week period. The nutrient supplement of the present invention is then added to the compost just prior to the application of casing. The compost is preferably maintained at a temperature of between about 72° F. and 80° F. during casing. In addition, a solution containing specific divalent cations is added to the compost several days prior to harvest. It is preferred that the delayed-release nutrient be added at the time of spawning.

Further objectives and advantages other than those set forth above will become apparent from the detailed description of the invention and the accompanying drawings.

BRIEF DESCRIPTION OF THE FIGURES

FIG. 4 depicts the temperature and humidity curves for the production of a dark-colored dehydrated mushroom product having a beefy, savory, chocolate flavor.

DETAILED DESCRIPTION OF THE INVENTION

Figure 1:
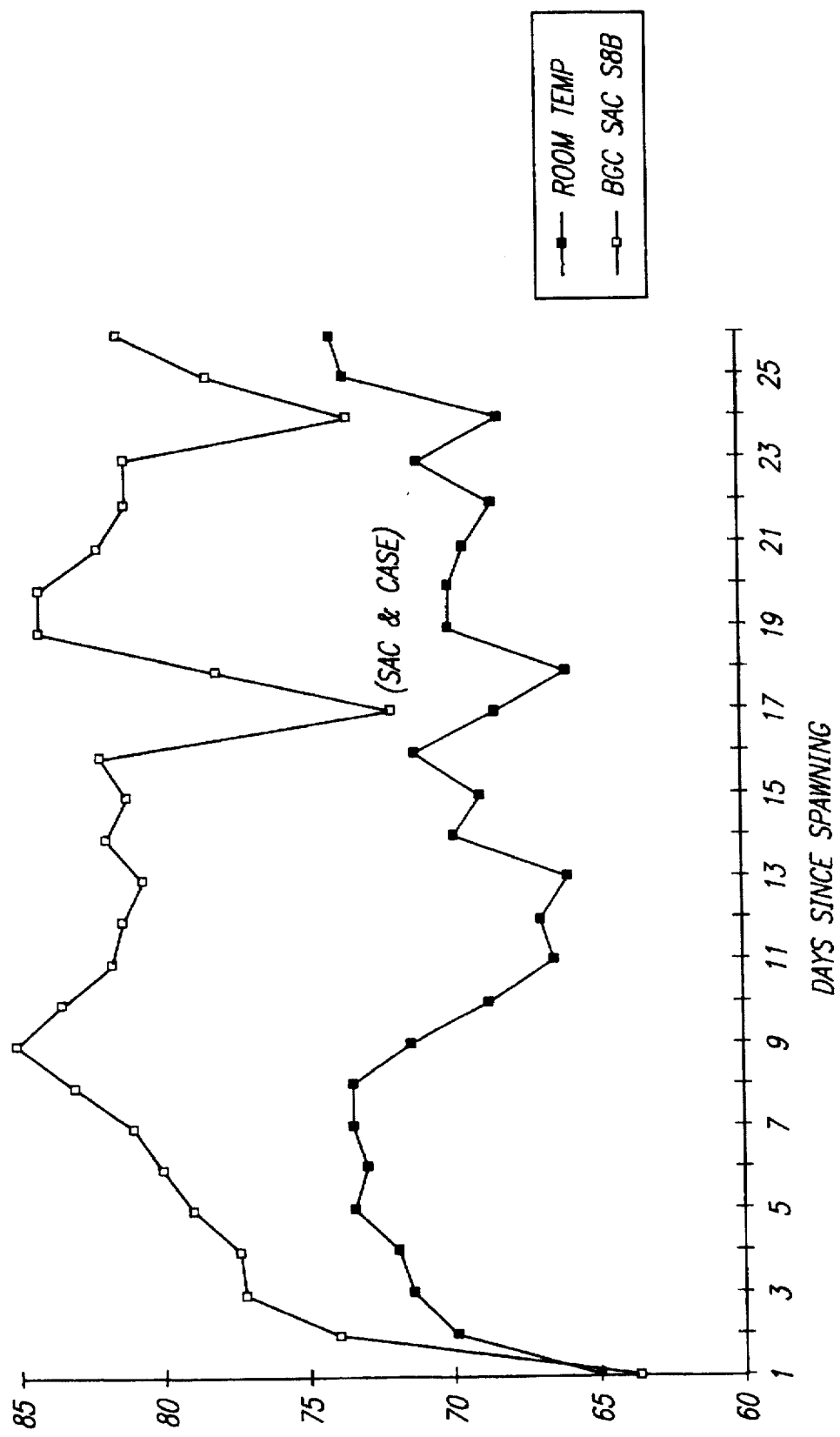
FIG. 1 depicts a typical crop temperature profile chart for a mushroom crop that has been supplemented at spawning (6% SPAWN MATE IISE, in 6.25 lb. of dry weight of compost/sq. ft.) and supplemented at casing with a nutrient supplement of the present invention.

The present invention relates to the production of three distinct savory flavor types of dehydrated mushrooms. All three flavor types of dehydrated mushrooms possess a "umami" or monosodium glutamate (MSG)-like mouthfeel and flavor synergy in addition to their own flavor characteristics. The three flavor types produced according to the present invention include: (1) light-colored, dehydrated mushrooms having a strong mushroom flavor, (2) tan-colored, dehydrated mushrooms having a meaty, buttery, savory flavor, and (3) dark-colored, dehydrated mushrooms having a beefy, savory, chocolate flavor.

The present invention also relates to a process for dehydrating mushrooms whereby the flavor of the dehydrated mushroom product produced is controlled. According to the present invention, it is possible to control the dehydration of mushrooms to produce either a light, tan or dark dehydrated mushroom product, each product having its own unique flavor characteristics. In addition, each dehydrated mushroom product possesses "umami" or MSG-like mouthfeel and flavor synergy, while containing a very low concentration of MSG and other flavor enhancers.

The present invention also relates to a growth media useful for producing mushrooms with a higher lipid content The media is composed of compost and an added nutrient supplement that produces mushrooms with a higher lipid content. Since oxidation products of fatty acids contribute to the flavor of mushrooms, increasing the lipid content in the mushroom tissue enables the production of more highly flavored mushrooms. The nutrient supplement system of the present invention also provides essential mineral co-factors for the optimal function of the enzyme lipoxygenase which operates to oxidize fatty acids into volatile flavor components.

The present invention also relates to a process for growing mushrooms using the nutrient supplement of the present invention, thereby enhancing the lipid content of the mushrooms produced. The growing process of the present invention does not produce unmanageable metabolic heat and, therefore, can be performed without disrupting current commercial mushroom cultural practice.

The present invention has the particular advantage of providing superior flavored dehydrated mushroom products and may be adapted for use with a wide variety of mushroom species including, but not limited to, Shiitake and Oyster mushrooms as well as the common button mushroom. The mushrooms of the present invention may be produced in conventional commercial growing facilities and conventional food dehydrating facilities. The mushrooms produced according to the present invention can be used in a myriad of different ways in the prepared foods business.

Following the teachings of the present invention, virtually any commercial genetic strain of mushroom will produce a superior flavored, dehydrated product. As a result, the grower can cultivate strains which he or she is familiar with and which are optimally suited for the available facilities.

The dehydrated mushroom products produced according to the present invention represent significant commercial applications in the food products area. Additionally, the present invention is of significance to the mushroom production business in that it adds a new product category and, therefore, an increased market for cultivated mushrooms.

The advantages and preferred embodiments of the present invention are illustrated by the following examples. These examples are not intended to be limiting. Rather, variations of the present invention within the level of ordinary skill are intended to fall within the scope of the present invention.

EXAMPLES

I. Nutrient Supplement

The nutrient supplementation of the present invention comprises a non-nutritive, hydrophobic matrix, such as vermiculite, perlite, micro-crystalline cellulose, or diatomaceous earth to which is added a polyunsaturated fat and a surfactant.

The fat employed in the nutrient supplement must not contain any antioxidants and is preferably a vegetable oil. Safflower oil is the most preferred vegetable oil.

A food-grade surfactant material should be added to the fat in an amount sufficient to constitute between about 1 and 3% by weight of the fat. The surfactant is preferably a phospholipid or a galactolipid. Lecithin phosphatide, (Centrolene A, Central Soya Co., Chicago, Ill.), the most preferred surfactant, is readily soluble in vegetable oil and can be mixed in a simple stirred tank.

The fat/surfactant combination is blended in a suitable liquid/solids blender with hydrophobic absorbent matrix particles having a particle size of between about 20 and 80 standard mesh. The particle size range is important to impart the correct surface to volume relationships to insure biological availability of the lipid nutrients and also provide a material that is easily incorporated in the compost with existing commercial methods and equipment. The fat/surfactant mixture is preferably added to the material through a spray bar and blended for 20 minutes. The preferred concentration of the fat in the hydrophobic absorbent matrix material is between about 30% and 45%. Once prepared, the blended product fat/surfactant/absorbent material may be stored under a nitrogen blanket in a polyethylene bag inside a fiber or steel drum.

II. Process For Growing Mushrooms Using The Nutrient Supplement

The nutrient supplement is preferably applied to compost at the time of casing or one day prior to casing by mechanically mixing the nutrient supplement into the compost. The compost used to grow the mushrooms should preferably be supplemented at spawning with a commercial delayed-release nutrient designed specifically for supplementation at spawning, such as FAST BREAK PLUS. (Penwest Foods), SPAWN MATE IISE (Spawn Mate Inc.), or CAMPBELL'S S51 (CAMSCO Inc.)

The nutrient supplement of the present invention is added to the compost in an amount sufficient for the nutrient supplement to constitute between about 3.2% and 5.4% of the dry weight of the compost. Once the nutrient supplement has been introduced, a casing layer is then applied.

The nutrient supplement provides a secondary supply of lipid nutrients that are available over the period between casing and fruiting. The nutrient supplement does not cause overheating of the compost or disruption of the mycelial mat when added as a casing. The added source of polyunsaturated lipids provided by the nutrient supplement is the primary source of carbon for increasing the lipid content of the mushroom fruit bodies.

The compost must be temperature controlled to keep the biomass in a range between about 72° F. and 80° F. FIG. 1 depicts a typical crop temperature profile chart for a mushroom crop that has been supplemented at spawning (6% SPAWN MATE IISE in 6.25 lb. of dry weight of compost/sq. ft.) and supplemented at casing with the nutrient supplement of the present invention. The air-m-bed temperature differential maximum is 13° F. This size temperature differential is regularly maintained in commercial mushroom growing facilities.

The most critical period for compost overheating is during the first three days after the nutrient supplement has been admixed at casing. FIG. 1 clearly shows that no adverse overheating of the compost occurs and that manageable air/bed differentials are maintained. The environmental conditions in the growing room are changed seven to ten days after casing in order to induce fruiting. Slightly cooler average temperatures, preferably between about 74° F. and 78° F. should be maintained in order to assure the highest synthesis of polyunsaturated fat by the mushroom fruiting body. The first mushrooms generally appear 19 to 21 days after casing.

Mushrooms mature on a weekly cycle. Typically, mushrooms are picked for two days and then are allowed to rest for five days until another group of mushrooms are ready to pick. These weekly maturations are called "flushes" or "breaks" of mushrooms. The addition of specific divalent cations in the watering solution is done prior to each flush. These cations are co-factors for the lipoxygenase enzyme and help to preserve the membrane integrity of the mushroom so that transport of nutrients is facilitated. Divalent cations that may be used include calcium, magnesium and manganese. Preferably, a 0.13% solution of $CaCl_2$ or a solution of 0.11% $MgCl_2$ is applied in multiple waterings 4 days prior to harvest or approximately 15 to 17 days after casing. The final application volume of these solutions is preferably about 0.35 gals./sq. ft.

The harvesting period generally lasts approximately 3 weeks during which time the temperatures of the compost are maintained between about 68° F. and 72° F. This temperature range insures the optimal formation of polyunsaturated fatty acids.

Upon harvest, the mushrooms should be immediately cooled to a temperature of around 34° F. which should preferably be attained before shipment to a dehydration facility. Cooling the mushrooms is a standard practice in mushroom culture and prevents unwanted or uncontrolled post harvest respiration.

III. Dehydration Process For Producing Dehydrated Mushroom Products Having Particular Flavors In order to dehydrate mushrooms according to the present invention, mushrooms are first sliced to between about ⅛ inch and ¼ inch and loaded on to drying trays. The mushroom slices are preferably loaded on to drying trays at a density of between about 0.32 lb./sq. ft. and 0.50 lb./sq. ft., depending on the dehydrated mushroom flavor desired and the capacity of the dryer.

The optimum loadings densities for producing the different ranges of dehydrated mushroom flavors is described in Table 1.

TABLE 1

| Mushroom Appearance | Mushroom Flavor | Density Of Mushroom On Drying Tray (lb./ft. sq.) |
|---|---|---|
| Light color | Intense mushroom | 0.32 |
| Tan color | Meaty, buttery, savory | 0.40 |
| Dark color | Beefy, savory, chocolate note | 0.50 |

One is able to selectively produce either a light, tan or dark dehydrated mushroom product, each with distinctively different flavors, by controlling the temperature, humidity and $CO_2$ concentration of the air in the dryer.

Figure 2:
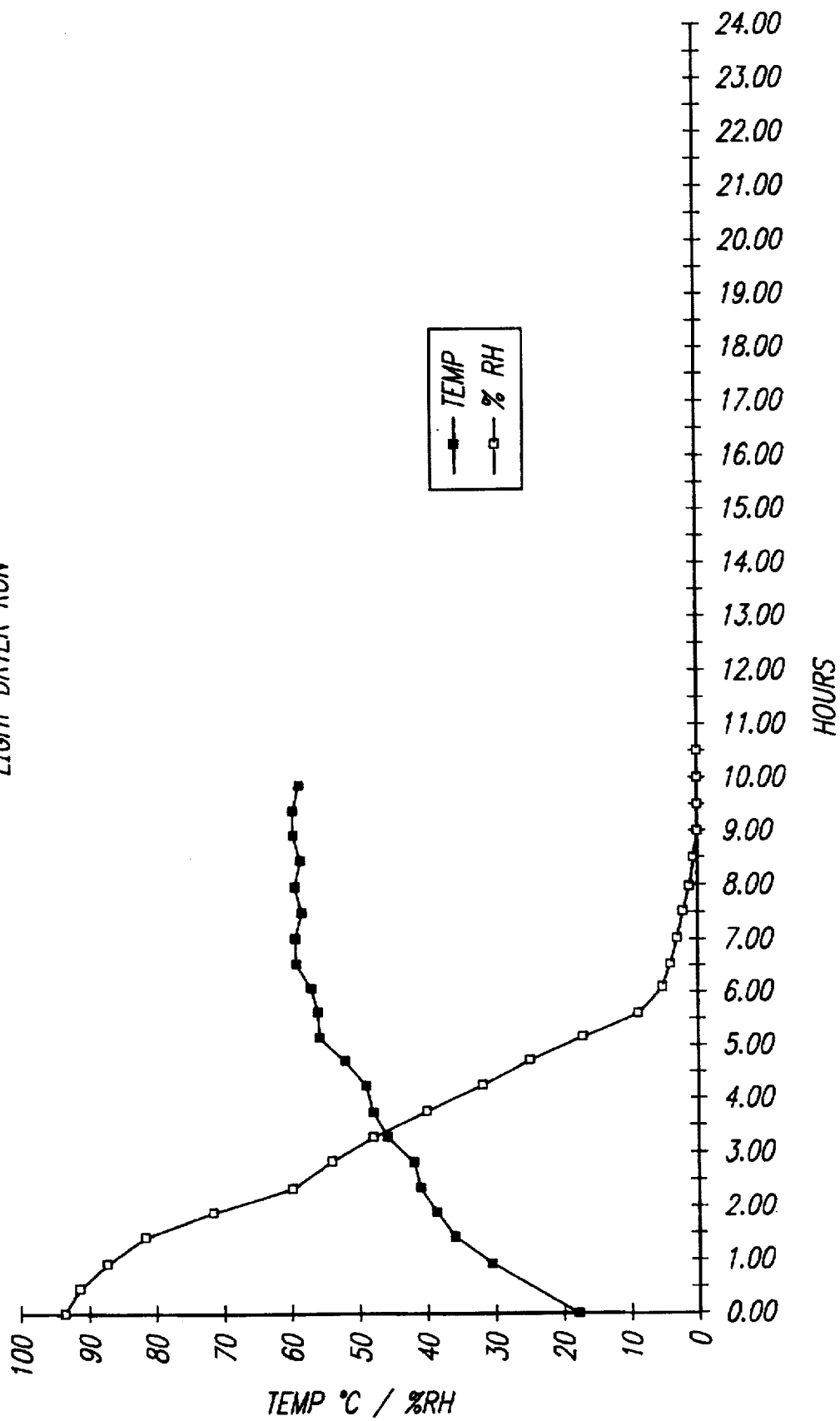
FIG. 2 depicts the temperature and humidity curves for the production of a light-colored, dehydrated mushroom product having an intense mushroom flavor.

FIG. 2 depicts temperature and humidity curves for the production of a light-colored, dehydrated mushroom product which has an intense mushroom flavor. In order to produce the light-colored, product, the dryer is preferably loaded at about 0.32 lb./sq. ft. The shelf dryer should be configured to limit the recycling of the drying air. Fresh air is preferably added at a rate of about 0.75 CFM/sq. ft. of product shelf area. As shown in FIG. 2, the humidity of the air within the dryer is kept at a low level by not allowing the drying air to recycle. The inlet temperature is controlled to produce the temperature curve illustrated in FIG. 2. The relatively low air flow and significant back pressure (from no recirculation) in the dryer results in a relatively low partial pressure of oxygen and the build up of post harvest respiratory $CO_2$. This results in the inhibition of oxidative browning but allows the lipoxidase reaction to occur. Maillard and Sircoker reactions are minimized due to the relatively small mount of free reducing sugars and amino acids in mushrooms. These substrates could be formed by the reaction of proteases and glycosidases. However, relatively rapid dehydration prevents there from being sufficient time before the water activity is too low to allow these reactions to make a contribution to the flavor and color profile of the final product.

Figure 3:
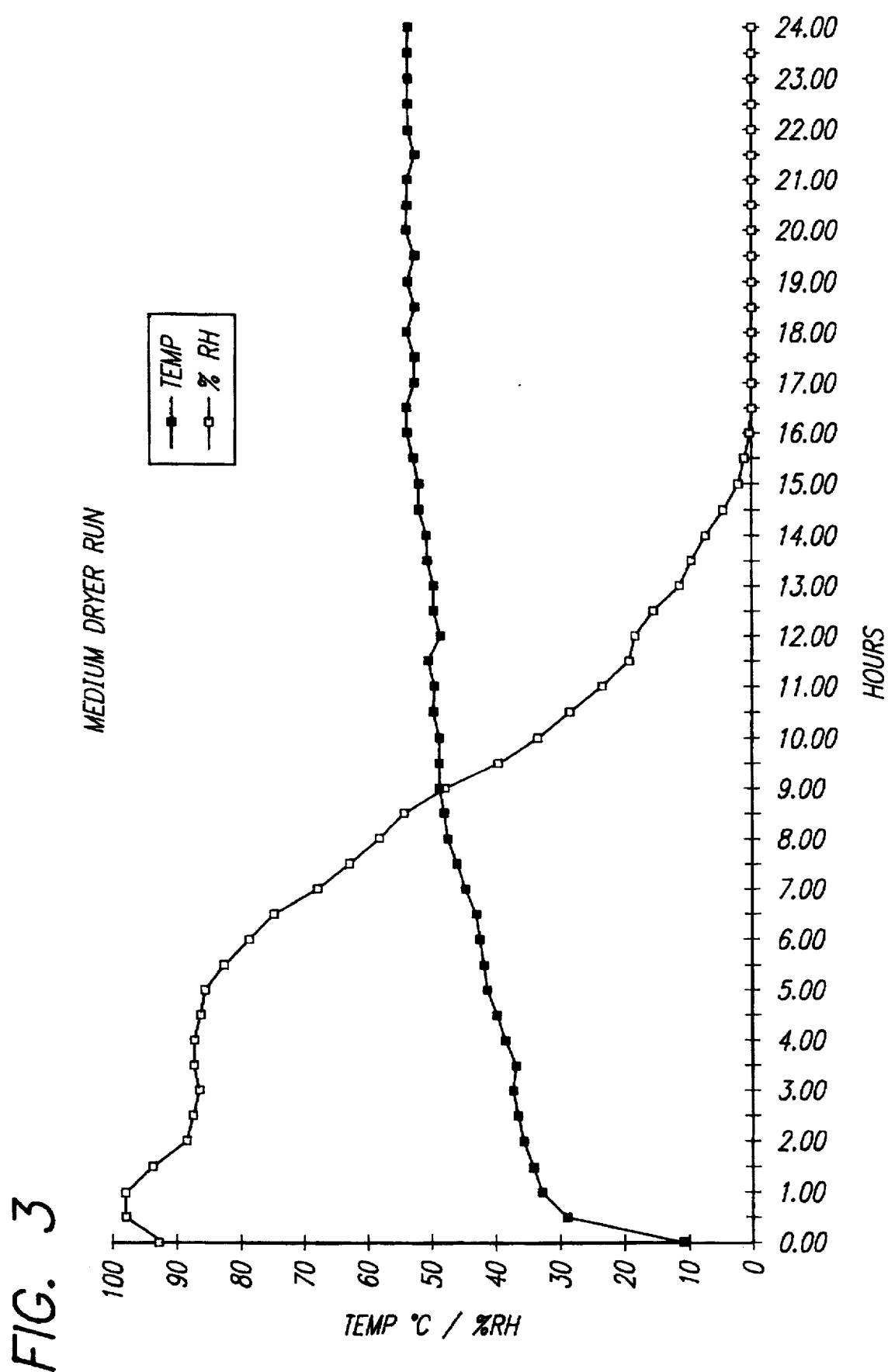
FIG. 3 depicts the temperature and humidity curves for the production of a tan-colored dehydrated mushroom product having a meaty, buttery, savory flavor.

FIG. 3 depicts the temperature and humidity curves for the production of a tan-colored, dehydrated mushroom product which has a meaty, buttery, savory flavor. In order to produce the m-colored product, the dryer is preferably loaded at about 0.40 lb./sq. ft. The drying air is preferably circulated at a rate of about 0.9 CFM/sq. ft. of product shelf area. For the first 4 hours of the dehydration, the air should be completely recycled with the exception of the normal leakage in the dryer. This procedure allows the relative humidity to remain over 90% as shown in FIG. 3. High humidity allows Maillard reactions to occur because of the production of reducing sugars by glycosidases. After about 4 hours, fresh air is introduced at 20% or 0.18 CFM/sq. ft. to allow the relative humidity of the air in the dryer to slowly decrease to 0% as depicted in FIG. 3. The high recirculation rate of the dryer air allows the respiratory $CO_2$ level to rise with a very low partial pressure of oxygen. Meanwhile, the temperature is preferably kept relatively constant as depicted in FIG. 3. Lower temperatures are employed than those used for the production of the dark-colored dehydrated mushroom product. These lower temperatures do not favor the Strecker reactions and browning reactions. As a result of these dehydration conditions, the flavor of the tan product arises primarily from the lipoxygenase and Maillard reactions.

FIG. 4 depicts the temperature and humidity curves for the production of a dark-colored, dehydrated mushroom product which has a beefy, savory, chocolate flavor. In order to produce the dark-colored product, the dryer is preferably loaded at about 0.50 lb./sq. ft. The drying air is preferably circulated at 1.1 CFM/sq. ft. of product shelf area. Fresh air is preferably introduced at 15% or 0.16 CFM/sq. ft. of product shelf area for the first 3 hours. The fresh air is then increased to 25% or 0.27 CFM/sq. ft. of product shelf area. According to this protocol, the high humidity is maintained for a protracted period. However, the partial pressure of oxygen is increased by admitting a larger amount of fresh air to the dryer. The total heat input is also increased such that the air in the dryer is maintained as illustrated in FIG. 4. These reaction conditions allow the lipoxygenase, Maillard, oxidative browning, and Strecker degradation reactions to occur and produce the dark-colored product. The increase in lipid supplies substrates for the lipoxygenase and the active aldehydes necessary for the Strecker reactions.

IV. Evaluation Of Flavor Of Dehydrated Mushroom Products

Dehydrated mushrooms were evaluated for flavor in several different ways: (1) chemical analyses, (2) sensory evaluation using descriptive flavor panels, and (3) sensory evaluation by trained flavorists and food technologists.

A total of 16 crops of mushrooms were grown with supplementation at spawning using a commercial delayed-release nutrient and at casing using the nutrient supplement of the present invention. Chemical analyses reveal an average increase in lipid content using the dual supplement system of 0.65% compared to mushrooms that were only supplemented at spawning. Commercially grown mushrooms contain about 0.5% fat. The lipid content of mushrooms grown according to the present invention is greater than 1%.

The mushrooms produced according to the present invention were evaluated using several sensory evaluation techniques and were used in processed food products and ingredients. Materials were also evaluated by expert flavorists.

Dehydrated mushrooms were evaluated by a trained sensory evaluation panel using a quantitative descriptive evaluation technique. Several evaluations were completed. An initial evaluation of the light color, intense mushroom flavor product was made in comparison to a control dehydrated mushroom grown under the same conditions. An "earthy/musty" descriptor, a "mushroom" descriptor and a "total flavor" descriptor was used.

TABLE 2

| Descriptive Panel Analysis | | |
|---|---|---|
| Descriptor | Control | BGC High Flavor |
| Earthy/Musty | 2.5 | 2.9 |
| Mushroom | 2.0 | 2.9 |
| Total Flavor | 4.0 | 5.4 |

The data presented in Table 2 indicates that there is a significant increase in total flavor of the mushrooms grown according to the present invention. However, both mushroom descriptors do not represent the total contribution to the flavor difference created by the present invention.

Samples of the dehydrated mushrooms were also used in a food application as an additive to a commercial, low salt chicken broth. The panel was asked to evaluate the contribution of the high flavor mushroom powder to the "umami" or "mouthfeel" effect that is often associated with hydrolyzed vegetable protein (HVP), monosodium glutarnate, and/or inosine monophosphate (IMP) used as flavor synergists in food.

TABLE 3

| Descriptive Panel Analysis | | |
|---|---|---|
| Descriptor | Control | BGC High Flavor |
| HVP (umami) | 4.0 | 5.5 |

The data presented in Table 3 shows that a significant part of the higher total flavor is the mouthfeel or flavor synergistic effect of the high flavor mushroom powder.

Various yeast products and yeast derivatives are used in manufactured foods for the enhancement of savory flavors including beef, chicken, other meats, cheeses and other products. Samples of ten of these industrial products were evaluated with 10% addition of high flavor mushroom powder. The products were sampled by expert flavorists whose primary expertise is yeast products. The expert flavorists reported an increase in mouthfeel or "umami" effect in all ten products. The expert flavorists also reported that the bitter note associated with all yeast flavor additives was reduced. In the cases where yeast products were targeted for the enhancement of meat or cheese, the flavorists reported that the meat and cheese notes were enhanced by the addition of the mushroom powder.

A group of expert flavorists was also asked to compare the three dehydrated mushroom groups described above as: (1) light color, intense mushroom flavor product, (2) tan color, meaty, buttery, savory type product, and (3) dark color, beefy, savory, chocolate note product. Each flavorists was asked to list the flavor descriptors for each product and suggest product application areas. Their responses are summarized in Table 5.

TABLE 4

Flavor Descriptors from Expert Flavorists

| Light Color Color | Tan Color | Dark |
|---|---|---|
| Creamy Note | Bready | Beefy |
| Earthy Crust | Wild Mushroom | Bread |
| Fresh Mushroom | Musty | Cocoa Like |
| Mild Brothy | Roasted Bread | Burnt |
| Musty | Buttery | Very Earthy |
| Nutty | Veal | Very |
| Roasted | | |
| Sweet | Sweet | Strong |
| Chocolate | | |
| Shellfish | | |
| Unleavened Bread | | |

This same group was then asked to suggest product categories for each of the three products. Their responses are summarized in Table 5.

TABLE 5

Product Categories Suggested By The Expert Flavorists

Light-Colored Material

For seafood and shellfish flavors
For broth, soup base, and soup mixes
Mushroom base soups
Ingredient in spaghetti or pizza sauce
Ingredient in beef, and pork gravies
Meat flavor enhancer ingredient in Italian foods
Ingredient in frozen dinner preparations
Pasta salad ingredient
Salad topping ingredient
Snack food ingredient
Ingredient in pates and fondues
Seasoning blend, salt enhancer or substitute Tan-Colored Material Soup or stock base ingredient
Flavor for vegetable soups
Gourmet mushroom soups
Gravies
Enhancer for beef products
Enhancer for veal products
Ingredient in noodle and rice mixes TABLE 5-continued Product Categories Suggested By The Expert Flavorists Ingredient for flavor in crackers Dark-Colored Material Enhancer for chocolate and cocoa
Enhancer for chicory coffee blends
Enhancer for caramel flavor
Enhancer for nutty flavors
Rounder for meat flavors
Ingredient in processed meats such as sausage, and cold cuts
Flavor for beef gravies
Flavor in bread crusts
As a bitter note As can be seen from the data presented in Table 5, the expert flavorists indicated a wide range of food applications for the dehydrated mushrooms prepared according to the present invention.

V. Flavor Stability Of Dehydrated Mushroom Products

The dehydrated mushroom products may be packaged in plastic film under vacuum or an inert atmosphere. Sensory evaluation of the products after storage for over one year indicated that the flavor is maintained for over one year at normal warehouse temperatures.

The aforementioned examples illustrate the various features of the present invention but are not intended to limit the scope of the instant invention as set forth in the claims. Numerous modifications and variations are possible in light of the teachings of the instant invention and are intended to be within the scope of the appended claims.

What is claimed is:

1. A nutrient supplement for growing mushrooms with an enhanced lipid content, said nutrient supplement comprising:

a particulate, non-nutritive, hydrophobic matrix having a particle size of between 20 and 80 standard mesh, said particle selected from the group consisting of vermiculite, perlite, microcrystalline cellulose, and diatomaceous earth;

a polyunsaturated fat; and a food grade surfactant, wherein said surfactant comprises between 1% and 3% by weight of said polyunsaturated fat, said polyunsaturated comprising between 30% and 45% by weight of said hydrophobic matrix.

2. A nutrient supplement of claim 1 wherein said polyunsaturated fat is a vegetable oil.

3. A nutrient supplement of claim 1 wherein said surfactant is selected from the group consisting of phospholipids and galactolipids.

4. A nutrient supplement of claim 1 wherein said surfactant is lecithin phosphatide.

5. A nutrient supplement of claim 3 wherein said polyunsaturated fat is a vegetable oil.

6. A media for growing mushrooms with an enhanced lipid content, said media comprising compost and a nutrient supplement of claim 1.

7. A media of claim 6 wherein said nutrient supplement comprises between 3.2% and 5.4% by dry weight of the compost.

8. A media of claim 7 wherein said polyunsaturated fat is a vegetable oil and said surfactant is selected from the group consisting of phospholipids and galactolipids.

* * * * *